April 30, 1957 J. W. DAWSON 2,790,941

TERMINAL LEAD CONSTRUCTION AND METHOD, AND SEMICONDUCTOR UNIT

Filed March 27, 1952

INVENTOR
JOHN W. DAWSON
BY Paul S. Martin
ATTORNEY

United States Patent Office 2,790,941 Patented Apr. 30, 1957

2,790,941

TERMINAL LEAD CONSTRUCTION AND METHOD, AND SEMICONDUCTOR UNIT

John W. Dawson, Winchester, Mass., assignor to Sylvania Electric Products Inc., a corporation of Massachusetts Application March 27, 1952, Serial No. 278,893

2 Claims. (Cl. 317—236)

The present invention is concerned with seals of terminal leads through a glass wall, and with semiconductor units using such terminal lead seals; and it is also concerned with the method of making such seals and semiconductor units.

The problem arises where a comparatively long, slender and ductile lead extends from a seal through a glass wall of an envelope that the glass may be fractured and the seal destroyed by bending stress applied to the external lead. The stress tends to bend the lead at the point where the lead emerges from the glass; and it is at this point that the stresses tending to fracture the glass are concentrated.

Various solutions to this problem have been proposed heretofore. An object of the present invention is to devise a new and effective sealing method and seal that is inherently protected from damage by such stresses. A further objective is to provide a novel semiconductor unit employing such protective seal and a novel method of making semiconductor units.

The proposal has been made that a lead be constructed of different thicknesses so as to be stiffer in the region of the seal than externally, so that all bending of the lead resulting from externally applied stresses would occur outside the region of the seal. This requires a thickness of lead that creates special seal-heating and heat-dissipation problems in the fabrication of semiconductor units which problems are minimized by the present invention.

A feature of this invention is the use of a metal ring as a component separate from the terminal lead, which ring is fused to the outside surface of the glass surrounding the emerging lead. This should be distinguished from an arrangement in which the metal ring is an integral part of the lead. The integral assembly is unnecessary for present purposes and is of higher cost, and where such integral assembly is used the ring and not the lead is usually sealed to the glass so as to require a vacuum-tight joint between the seal and the ring. More significant, however, is the fact that the endwise position of the lead in relation to the glass can be determined by the requirements of the element carried by the lead inside the envelope and the metal ring can independently be joined to the outside surface of the glass wall at whatever position that surface happens to be. Were the metal ring integral with the lead, the position of the outside surface of the seal would be fixed and there would be no latitude allowed for positioning the electrode or the like carried by that lead inside the envelope.

Figure 1:
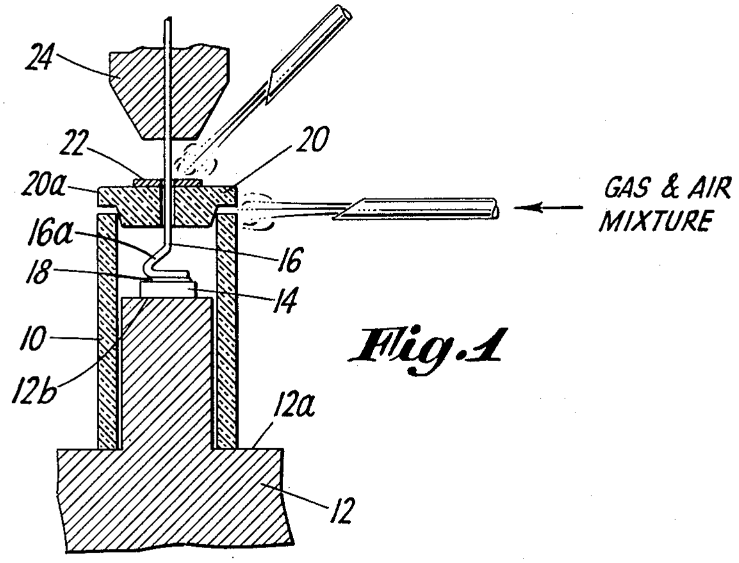
Figure 2:
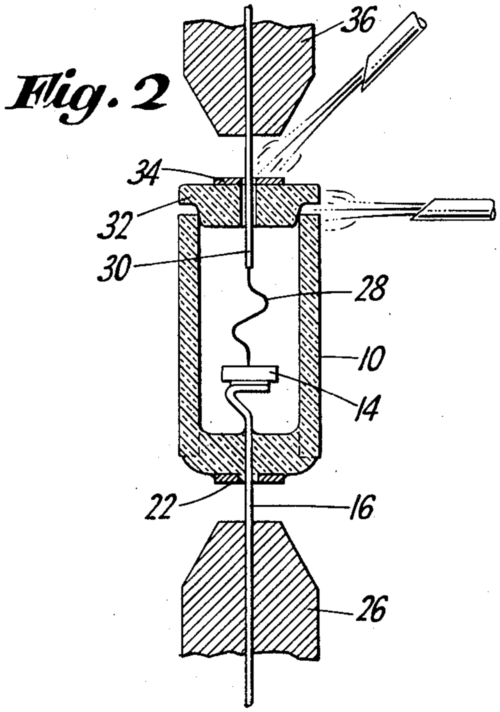

The invention, and its further features and aspects of novelty, will be better appreciated from the following detailed disclosure of an exemplary embodiment shown in the accompanying drawings. This embodiment also illustrates features claimed in co-pending application entitled "Method of Assembling Semiconductor Units," Serial No. 273,699 filed February 27, 1952, by Garrett D. Bowne, now Patent No. 2,699,594. In the accompanying drawings, the invention is shown applied to the fabrication of a form of "crystal" diode useful as a rectifier or a detector. Fig. 1 is a greatly enlarged longitudinal cross-section view of a first step in the fabrication of such diode; Fig. 2 is a second step in the fabrication of such diode; and Fig. 3 shows the completed diode.

Figure 3:
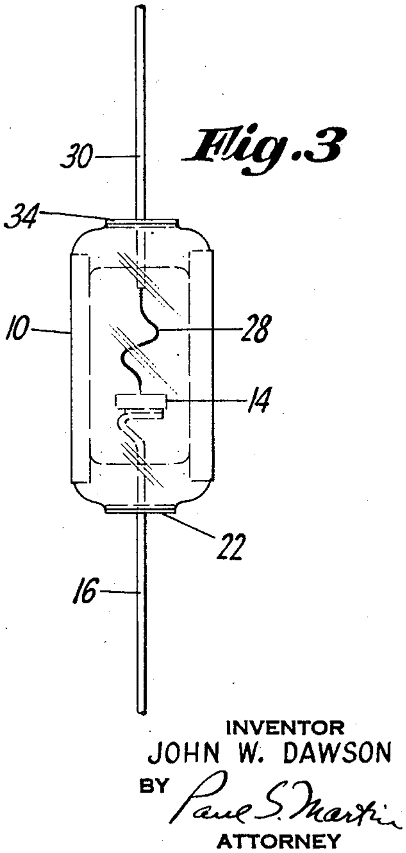

Referring first to Fig. 3, it is seen that leads 16 and 30 project a considerable distance in opposite directions from the outside surface of glass envelope 10, and that bending stress applied to the leads would be a maximum at the envelope surface where destructive stresses might be developed in the glass. This is prevented, however, by metal rings 22 and 34 fitting closely around the terminal wires and having a fused mechanical connection to the outside surface of the envelope. In Figs. 1 and 2 the spacing between the rings and their respective terminal wires is greatly exaggerated to emphasize graphically the fact that the rings are movable along the wire. In an example, the wire diameter is 0.020 inch, and a punched disc 0.012 inch thick having a hole of 0.024 and an outside diameter of 0.062 all these dimensions being subject to unintended minor variations.

Leads 16 and 30 extend through the wall of the glass envelope so as to support a "crystal," as of germanium, which is a semiconductor susceptible to damage by excessive heating and is secured as by soft solder to lead 16 in a connection which itself may be disturbed by glass sealing heat. Portion **16*a* of lead 16 is bent as shown so as to provide a large surface carrying germanium body 14 and is flattened and contoured so as to incorporate substantial length, thereby affording substantial thermal isolation between the crystal and the seal of lead 16** through the glass envelope.

Lead 30 carries a resilient sharp ended wire contact 28 in critical pressure engagement with crystal 14. The endwise position of the second lead sealed through the glass is determined during the assembly solely on the basis of establishing the necessary engagement between contact 28 and body 14. The position of the ring sealed to the envelope surface is freely adjustable along the lead and is determined by the glass that drifts and flows during the sealing operation, as will be seen.

The method of making the unit of Fig. 3 is illustrated in Figs. 1 and 2. The first step involves supporting a length of glass tubing 10 on a metal or ceramic mandrel 12, shoulder **12*a* supporting the lower end of glass tube 10. Additionally, the end 12*b* of the mandrel supports crystal 14 joined by soft solder connection 18 to terminal lead 16, this lead being centered coaxially in relation to tube 10 by chuck 24. Before lead 16 is inserted into the chuck, a glass ring 20 is first threaded onto the lead. A metal ring 22 is also dropped on the lead. Glass ring 20 is of low melting glass, fusing at 450 to 500° C. Glass tube 10 is of higher melting glass. Lead 16 is of dumet or other material appropriate for forming a good glass-to-metal seal with the glass used. The hole in ring 22 is made no larger than will permit convenient assembly on lead 16**.

With the parts assembled as illustrated in Fig. 1, the edge portion **20*a* of glass ring 20 is heated where that glass ring is to be sealed to the end of tube 10; and the metal ring and lead 16 to which ring 20 is to be sealed is also heated. Mandrel 12 and chuck 24** are rotated during this flame-sealing operation for uniform heating, although other known heating arrangements may be substituted such as a heating coil of resistance wire loosely encircling the parts to be heated.

In Fig. 2 the unit formed at Fig. 1 is shown with lead 16 carried in chuck 26 and additional parts held in assembly preparatory to the final fabrication step in forming the unit of Fig. 3. Thus low melting glass ring 32, identical to ring 20, is shown engaging the open end of glass tube 10 and threaded on lead 30; and metal ring 34 is similarly threaded on lead 30 and rests against glass ring 32. The sharp-ended wire contact or "whisker" 28 suitably secured to lead 30 is placed in endwise engagement with crystal 14, so as to exert a somewhat critical pressure against that body. This pressure is established by supporting wire 30 with a chuck 36; and the contact region of body 14 is processed by electrical pulsing for optimum performance according to predetermined standards. The seal formed in Fig. 2 by directing heating flames at the periphery of ring 32 and in the region of lead 30 and ring 34 maintains the established contact. In both sealing operations of Figs. 1 and 2, the position of each diode element, 14 and 28 respectively, is determined as a variable which is totally independent of the position of metal ring 22 or 34 in relation to the corresponding surface of the envelope. Actually the outside end surface of the envelope moves during the formation of the end seals, and the metal rings remain in contact with flowing glass so as finally to be fused to the outside end surface of the envelope. In that position bending of the leads is prevented from aplying destructive stresses to the glass where those leads emerge from the glass.

Elements 22 and 34 are punched from sheet metal described as punched and are "closed" annuli. Such closed forms of ring is of uniform stress-resisting properties in all directions of bending of wires 16 and 30. It is possible to use a slit or "open" ring, either punched or of wire and either with overlapping ends or abutting ends, with some sacrifice in strength at the slit or opening. The open ring has the desirable characteristic of being movable during assembly laterally across the terminal wires, with the slit or opening momentarily spread to allow the wire to pass to the center hole of the ring. In contrast, the closed ring must be threaded over the end and along the wire. The slit ring, while somewhat weaker than the closed ring is thus of significant advantage from the manufacturing point of view.

The seal and the method of making this seal have particular merit in connection with the semiconductor unit where critical endwise positions of the leads should be independently adjustable without reference to the position of any such part as ring 22 or 34; but wider application of the invention and varied modifications of detail will occur to those skilled in the art and accordingly the appended claims should be given such broad interpretation as is consistent with the spirit and scope of the invention.

What I claim is:

1. A semiconductor unit including a glass envelope, a semiconductor element and a sharp ended wire contact element engaging said semiconductor element in said envelope, a pair of terminal leads sealed in and extending through said glass envelope and supporting said elements in critical pressure contact in said envelope, each of said leads having a relatively long and slender portion projecting freely from said envelope, and metal rings sealed to the outside surface of said glass envelope and closely encircling said leads, respectively, where said leads emerge from the glass.

2. A semiconductor device comprising an envelope, a semiconductor element and a contact element within said envelope in predetermined relation to provide critical pressure contact, at least one of said elements being carried solely by a terminal lead extending through a seal portion of said envelope, said seal comprising a glass member fused to said envelope and to the lead, and a flat metal ring closely encircling the lead outwardly of the seal and in fused engagement with said seal, said ring being free of direct metallic bond to said lead.

References Cited in the file of this patent

UNITED STATES PATENTS

| | | |
|---|---|---|
| D. 156,501 | Gates | Dec. 20, 1949 |
| 756,676 | Midgley | Apr. 5, 1904 |
| 2,106,394 | Mitchell | Jan. 25, 1938 |
| 2,174,375 | Beggs | Sept. 26, 1939 |
| 2,215,798 | Schedel | Sept. 24, 1940 |
| 2,265,821 | Siegel | Dec. 9, 1941 |
| 2,462,020 | Craig | Feb. 15, 1949 |
| 2,572,993 | Douglas et al. | Oct. 30, 1951 |
| 2,598,241 | Elenbaas et al. | May 27, 1952 |
| 2,626,985 | Gates | Jan. 27, 1953 |
| 2,633,489 | Kinman | Mar. 31, 1953 |

FOREIGN PATENTS

| | | |
|---|---|---|
| 629,742 | Great Britain | Sept. 27, 1949 |